US012609725B2

(12) United States Patent
Lin

(10) Patent No.: US 12,609,725 B2
(45) Date of Patent: Apr. 21, 2026

(54) HANDHELD DEVICE CASING WITH A BUTTON MODULE

(71) Applicant: Cheng Uei Precision Industry Co., LTD., New Taipei City (TW)

(72) Inventor: Chin-Chung Lin, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 319 days.

(21) Appl. No.: 18/415,455

(22) Filed: Jan. 17, 2024

(65) Prior Publication Data

US 2024/0372575 A1 Nov. 7, 2024

(30) Foreign Application Priority Data

May 3, 2023 (CN) .......................... 202321022875.2

(51) Int. Cl.
H04B 1/3827 (2015.01)
H04B 1/38 (2015.01)
H04M 1/7246 (2021.01)

(52) U.S. Cl.
CPC ............. H04B 1/3833 (2013.01); H04B 1/38 (2013.01); H04M 1/7246 (2021.01)

(58) Field of Classification Search
CPC ...... H04B 1/3833; H04B 1/38; H04M 1/7246
See application file for complete search history.

(56) References Cited

U.S. PATENT DOCUMENTS

| | | | | |
|---|---|---|---|---|
| 7,949,379 B2 * | 5/2011 | Lu | ....................... | H04M 1/0216 |
| | | | | 455/575.1 |
| 9,216,788 B1 * | 12/2015 | Hsu | ........................... | B62J 1/10 |
| 9,985,370 B2 * | 5/2018 | Asanuma | ............ | H01R 12/774 |
| 11,929,216 B1 * | 3/2024 | Hsieh | ................ | H01H 13/7065 |
| 12,469,672 B2 * | 11/2025 | An | ........................... | H01J 37/20 |
| 2007/0164659 A1 * | 7/2007 | Lee | ....................... | G06F 3/1423 |
| | | | | 313/500 |
| 2010/0084874 A1 * | 4/2010 | Yiming | .................. | E05C 9/045 |
| | | | | 292/113 |
| 2010/0275706 A1 * | 11/2010 | Chen | .................... | A45B 25/143 |
| | | | | 74/89.22 |
| 2014/0004913 A1 * | 1/2014 | Kimura | ............... | H04B 1/3833 |
| | | | | 455/575.1 |
| 2015/0118884 A1 * | 4/2015 | Hu | ....................... | H04B 1/3816 |
| | | | | 439/310 |

(Continued)

*Primary Examiner* — Dominic E Rego

(74) *Attorney, Agent, or Firm* — Cheng-Ju Chiang

(57) ABSTRACT

A handheld device casing with button module includes a shell, a button module and a handheld computer. The button module is disposed in the shell. The button module has a main portion. The main portion has a first penetrating groove, a first triggering structure and an elastic arm. The first triggering structure is disposed to one end of the first penetrating groove. The elastic arm is disposed in the first penetrating groove. A bottom surface of the elastic arm has a second triggering structure. The handheld computer is disposed in a middle of the shell. The handheld computer has a first function button and a second function button. The first triggering structure is corresponding to the first function button. The second triggering structure is corresponding to the second function button.

17 Claims, 8 Drawing Sheets

100

(56)          References Cited

U.S. PATENT DOCUMENTS

| | | | | |
|---|---|---|---|---|
| 2016/0107668 | A1* | 4/2016 | Robins | B62B 3/1472 |
| | | | | 224/411 |
| 2017/0062990 | A1* | 3/2017 | Yang | H01R 13/6585 |
| 2019/0238668 | A1* | 8/2019 | Chen | H04M 1/0264 |
| 2020/0030692 | A1* | 1/2020 | Chou | A63F 13/98 |
| 2020/0148131 | A1* | 5/2020 | Tan | B60R 11/0252 |
| 2021/0167544 | A1* | 6/2021 | Hsu | H01R 43/24 |
| 2021/0362662 | A1* | 11/2021 | Wittmann | B60R 13/07 |
| 2022/0136266 | A1* | 5/2022 | Le Gall | E04G 25/04 |
| | | | | 160/368.1 |
| 2022/0203514 | A1* | 6/2022 | Dennis | B25F 5/006 |
| 2023/0187881 | A1* | 6/2023 | Lee | H01R 13/6585 |
| | | | | 439/607.05 |
| 2023/0225417 | A1* | 7/2023 | Lei | A24F 40/485 |
| | | | | 131/329 |

* cited by examiner

HANDHELD DEVICE CASING WITH A BUTTON MODULE

CROSS-REFERENCE TO RELATED APPLICATION

The present application is based on, and claims priority from, China Patent Application No. 202321022875.2, filed May 3, 2023, the disclosure of which is hereby incorporated by reference herein in its entirety.

BACKGROUND OF THE INVENTION

1. Field of the Invention

The present invention generally relates to a handheld device casing with a button module, and more particularly to a handheld device casing with a button module which prevents a linkage and a wrong operation between two adjacent buttons of the handheld device casing with the button module.

2. Description of the Prior Art

With the development of a wireless communication technology and an information processing technology, a mobile phone, a tablet computer and other electronic products rise, so that consumers enjoy various conveniences wherever and whenever, and the various conveniences are brought by a high technology. Functions of an electronic product are increased. A key board of a handheld device casing or a side wall of a shell must increase a corresponding function button to realize a function control of the handheld device casing.

A conventional function button structure of the handheld device casing adopts a multi-button design. The conventional function button structure which is the multi-button design is relatively complicated and has a higher manufacture cost. The handheld device casing is developed towards a miniaturization, a distance between two adjacent buttons of the conventional function button structure is also shortened. However, when the conventional function button structure is pressed downward in a usage process, the two adjacent buttons easily form a linkage phenomenon, and then a wrong operation of the conventional function button structure is caused. A usage performance of the handheld device casing is affected.

Thus, it is essential to provide an innovative handheld device casing with a button module which prevents a linkage and a wrong operation between two adjacent buttons of the handheld device casing with the button module.

SUMMARY OF THE INVENTION

An object of the present invention is to provide a handheld device casing with a button module which prevents a linkage and a wrong operation between two adjacent buttons of the handheld device casing with the button module. The handheld device casing with the button module includes a shell, a button module and a handheld computer. The shell has a propping wall, and a peripheral wall protruded frontward from a periphery of the propping wall. Two portions of a front surface of the propping wall of the shell extend frontward to form a first protruding portion and a second protruding portion. A middle of a front of a lower portion of the second protruding portion is recessed inward to form a locating groove. The button module is disposed in the shell. The button module has a main portion. The main portion has a first penetrating groove, a first triggering structure and an elastic arm. The first triggering structure is disposed to one end of the first penetrating groove. The first triggering structure is disposed to a bottom surface of the main portion. The first triggering structure is corresponding to the first protruding portion. The elastic arm is disposed in the first penetrating groove. The elastic arm is connected to a side wall of the first penetrating groove. The side wall of the first penetrating groove is far away from the first triggering structure. A bottom surface of the elastic arm has a second triggering structure and an abutting structure. The abutting structure is disposed between the first triggering structure and the second triggering structure. The second triggering structure is corresponding to the second protruding portion. The second triggering structure is disposed in the locating groove. The handheld computer is disposed in a middle of the shell. The handheld computer has a first function button and a second function button. The first triggering structure is corresponding to the first function button. The second triggering structure is corresponding to the second function button.

Another object of the present invention is to provide a handheld device casing with a button module. The handheld device casing with the button module includes a shell, a button module and a handheld computer. The button module is disposed in the shell. The button module has a main portion, a first fastening portion, a first triggering structure, a first penetrating groove, an elastic arm and a second triggering structure. The first fastening portion is disposed on a top surface of one end of the main portion. The first fastening portion is connected with the shell. The first triggering structure is extended downward from a bottom surface of the other end of the main portion. The first penetrating groove is formed in the main portion. The first penetrating groove is disposed between the first fastening portion and the first triggering structure. The elastic arm is disposed in the first penetrating groove. The elastic arm is connected to a side wall of the first penetrating groove. The side wall of the first penetrating groove is close to the first fastening portion. The elastic arm is a cantilever arm. The second triggering structure is extended downward from a bottom surface of the elastic arm. The handheld computer is accommodated in the shell. The handheld computer has a first function button and a second function button. The first function button is disposed inside the shell. The first triggering structure is corresponding to the first function button. The second function button is disposed inside the shell. The second triggering structure is corresponding to the second function button.

Another object of the present invention is to provide a handheld device casing with a button module. The handheld device casing with the button module includes a shell, a button module and a handheld computer. The button module is disposed in the shell. The button module has a main portion, a first fastening portion, a second fastening portion, a first triggering structure, a pressing button, a first penetrating groove, an elastic arm, a second triggering structure and an abutting structure. The first fastening portion is disposed on a top surface of one end of the main portion. The first fastening portion is connected with the shell. The second fastening portion is fastened in the shell. One side of the first fastening portion extends downward to form the second fastening portion. The first triggering structure is extended downward from a bottom surface of the other end of the main portion. The pressing button is disposed on a top surface of the other end of the main portion. The first triggering structure is opposite to the pressing button. The first penetrating groove is formed in the main portion. The first penetrating groove is disposed between the first fastening portion and the first triggering structure. The elastic arm is disposed in the first penetrating groove. The elastic arm is connected to a side wall of the first penetrating groove. The side wall of the first penetrating groove is close to the first fastening portion. The second triggering structure is extended downward from a middle of a bottom surface of the elastic arm. The abutting structure is disposed to the bottom surface of the elastic arm. The abutting structure is disposed between the first triggering structure and the second triggering structure. The handheld computer is disposed in a middle of the shell. The handheld computer has a housing, a first function button and a second function button. The first triggering structure is corresponding to the first function button. The second triggering structure is corresponding to the second function button. The abutting structure is located between the first function button and the second function button. The abutting structure is corresponding to the housing.

As described above, when the button module is pressed, the pressing button and the elastic arm are prevented from being simultaneously triggered by the first penetrating groove. The first triggering structure of the button module is corresponding to the first function button of the handheld computer, and the second triggering structure of the button module is corresponding to the second function button of the handheld computer, so the handheld computer keeps a distance from the shell, and a function of the handheld computer is still used, the handheld device casing with the button module is able to be cooperated with various handheld computers to proceed with an operation, and the handheld device casing with the button module is prevented from simultaneously pressing multiple buttons at the same time. As a result, the handheld device casing with the button module prevents a linkage and a wrong operation between two adjacent buttons of the handheld device casing with the button module.

BRIEF DESCRIPTION OF THE DRAWINGS

The present invention will be apparent to those skilled in the art by reading the following description, with reference to the attached drawings, in which.

4

DETAILED DESCRIPTION OF THE INVENTION

Figure 1:
FIG. 1 is a perspective view of a handheld device casing with a button module according to a preferred embodiment of the present invention.
Figure 1:
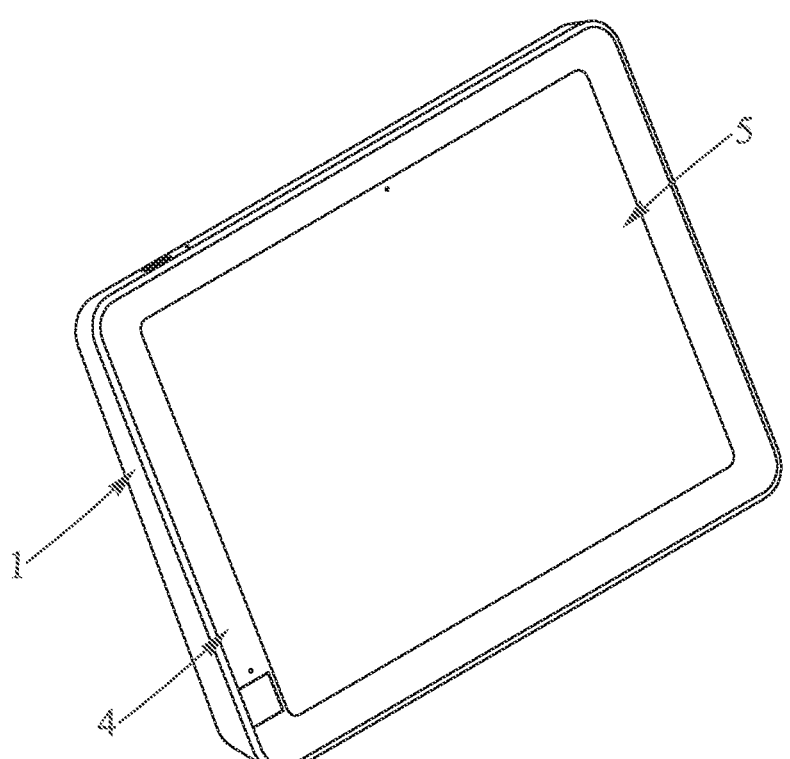
Figure 2:
FIG. 2 is a partially exploded view of the handheld device casing with the button module of FIG. 1.
Figure 3:
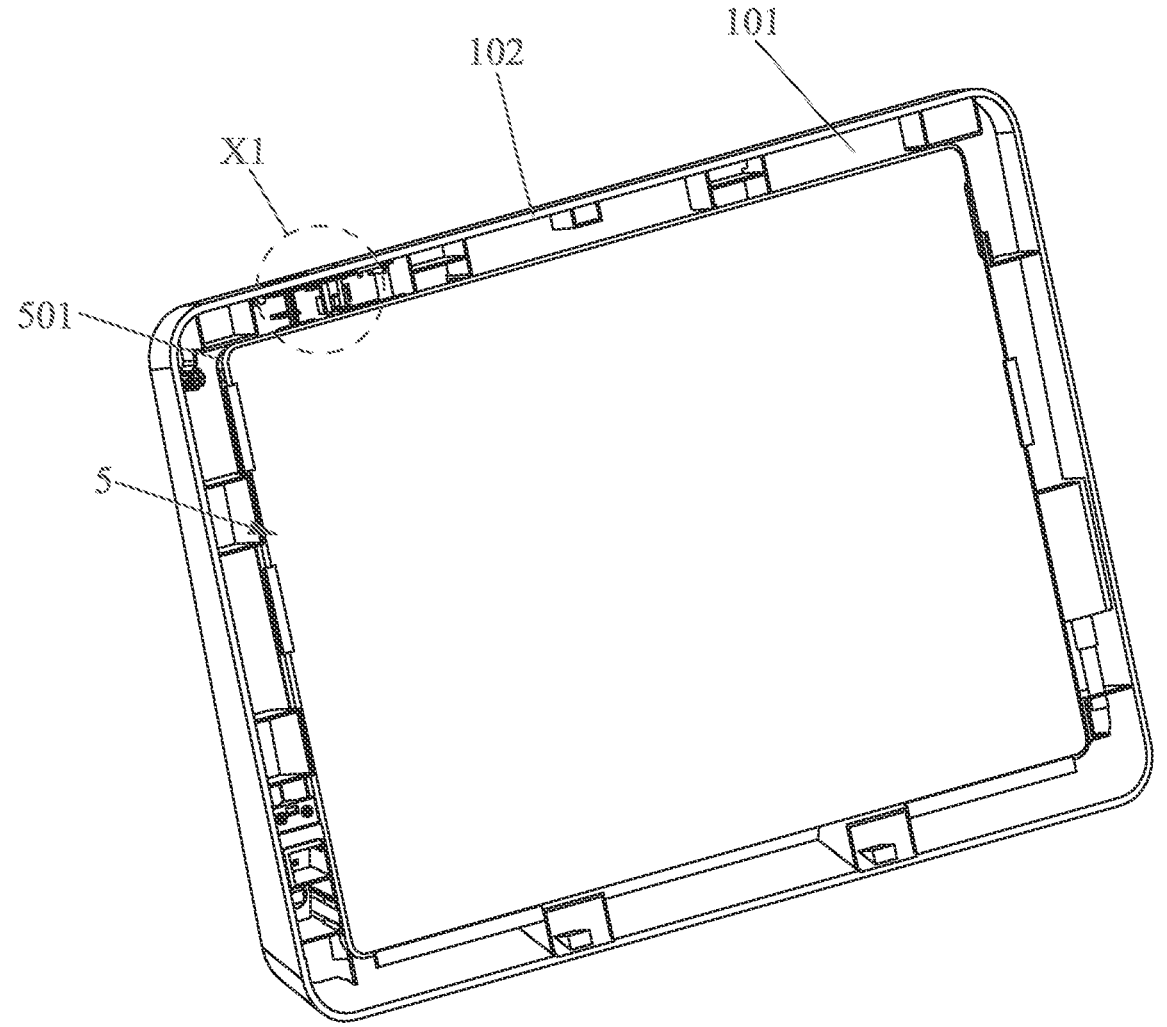
FIG. 3 is a partially assembled view of the handheld device casing with the button module of FIG. 1.

With reference to FIG. 1 to FIG. 4, a handheld device casing with a button module 100 according to a preferred embodiment of the present invention is shown. The handheld device casing with the button module 100 includes a shell 1, a button module 2, a frame 3, a front cover 4 and a handheld computer 5. The button module 2 is disposed in the shell 1. The frame 3 is disposed to a front surface of the shell 1. The front cover 4 is disposed to a front surface of the frame 3. The handheld computer 5 is disposed in a middle of the shell 1. In the preferred embodiment, the handheld computer 5 is an iPad.

Referring to FIG. 3 to FIG. 8, the button module 2 has a main portion 20, a pressing button 21, a first penetrating groove 201, a first triggering structure 22, an elastic arm 23, a second triggering structure 24, an abutting structure 25, a connecting portion 26, a first fastening portion 27 and a second fastening portion 28. The first fastening portion 27 is connected with the shell 1. The main portion 20 has the first penetrating groove 201, the first triggering structure 22 and the elastic arm 23. The first triggering structure 22 is disposed to one end of the first penetrating groove 201. The first triggering structure 22 is disposed to a bottom surface of the main portion 20. The first fastening portion 27 is disposed on a top surface of one end of the main portion 20. The pressing button 21 is disposed on a top surface of the other end of the main portion 20. The pressing button 21 projects beyond a top surface of the main portion 20. The first triggering structure 22 is disposed to a bottom surface of the pressing button 21. The pressing button 21 is fastened in a corresponding mechanism of the shell 1. The first triggering structure 22 is extended downward from a bottom surface of the other end of the main portion 20. The first triggering structure 22 is opposite to the pressing button 21. The first triggering structure 22 is corresponding to a corresponding segment of the shell 1.

The first penetrating groove 201 is formed in the main portion 20. A middle of the main portion 20 defines the first penetrating groove 201 penetrating through the top surface and the bottom surface of the main portion 20. The elastic arm 23 is disposed in the first penetrating groove 201. The top surface of the one end of the main portion 20 extends upward to form the first fastening portion 27. One end of the elastic arm 23 is connected with the first fastening portion 27. The first penetrating groove 201 is disposed between the first fastening portion 27 and the first triggering structure 22. The pressing button 21 and the first fastening portion 27 are disposed to the two top surfaces of the two opposite ends of the main portion 20. The elastic arm 23 is disposed in the first penetrating groove 201. The elastic arm 23 is a cantilever arm. The elastic arm 23 is connected to a side wall 231 of the first penetrating groove 201. The side wall 231 of the first penetrating groove 201 is close to the first fastening portion 27. The side wall 231 of the first penetrating groove 201 is far away from the first triggering structure 22.

When the button module 2 is pressed downward, the first penetrating groove 201 is prevented from triggering the pressing button 21 and the elastic arm 23 at the same time. The pressing button 21 and the first triggering structure 22 are disposed to the one end of the first penetrating groove 201. The first fastening portion 27 is disposed to the other end of the first penetrating groove 201. A bottom surface of the elastic arm 23 has the second triggering structure 24 and the abutting structure 25. The second triggering structure 24 is extended downward from a middle of the bottom surface of the elastic arm 23. The second triggering structure 24 is corresponding to a corresponding mechanism of the handheld computer 5. The abutting structure 25 is disposed to the bottom surface of the elastic arm 23. One end of the bottom surface of the elastic arm 23 extends downward to form the abutting structure 25.

The abutting structure 25 is disposed adjacent to one end of the second triggering structure 24. The abutting structure 25 is disposed between the first triggering structure 22 and the second triggering structure 24. The one end of the bottom surface of the elastic arm 23 extends downward to form the connecting portion 26. The connecting portion 26 is disposed between the second triggering structure 24 and the abutting structure 25. The connecting portion 26 is connected with an upper portion of the second triggering structure 24. The connecting portion 26 is connected with an upper portion of the abutting structure 25. The connecting portion 26 is connected between the upper portion of the second triggering structure 24 and the upper portion of the abutting structure 25. The connecting portion 26 is used for reinforcing a structural strength between the second triggering structure 24 and the abutting structure 25.

In the preferred embodiment, a length of the abutting structure 25 is longer than a length of the second triggering structure 24. When the elastic arm 23 is pressed downward, the second triggering structure 24 presses downward the corresponding mechanism of the handheld computer 5. The handheld computer 5 further has a housing 501. The abutting structure 25 is corresponding to the housing 501 of the handheld computer 5. The abutting structure 25 abuts downward against the housing 501 of the handheld computer 5. The abutting structure 25 prevents the elastic arm 23 from being overly deep pressed downward. The first triggering structure 22 and the second triggering structure 24 press downward two corresponding mechanisms of the handheld computer 5, respectively. The first triggering structure 22 and the second triggering structure 24 increase a using distance between the handheld computer 5 and the shell 1.

The first fastening portion 27 has a locating hole 271 penetrating through a top surface and a bottom surface of the first fastening portion 27. In the preferred embodiment, the first fastening portion 27 has two locating holes 271 penetrating through the top surface and the bottom surface of the first fastening portion 27. The two locating holes 271 are disposed to two corresponding positions of the shell 1 to realize that the button module 2 is located to the shell 1, and the button module 2 is fixed to the shell 1.

One side of the first fastening portion 27 extends downward to form the second fastening portion 28. A rear side of the first fastening portion 27 extends downward to form the second fastening portion 28. The second fastening portion 28 is disposed to a corresponding location of the shell 1. The second fastening portion 28 is fastened in the shell 1. The second fastening portion 28 has a second penetrating groove 281, a locking hook 282 and a notch 283. An upper portion of the second fastening portion 28 has the second penetrating groove 281. The second penetrating groove 281 penetrates through a front surface and a rear surface of the second fastening portion 28. The second penetrating groove 281 is shown as a lying L shape. A mouth of the second penetrating groove 281 faces downward. A lower portion of the second fastening portion 28 is recessed inward to form the notch 283. The notch 283 is shown as a rectangular shape.

The second fastening portion 28 has an isolating portion 284 disposed between the second penetrating groove 281 and the notch 283. The second penetrating groove 281 and the notch 283 are isolated by the isolating portion 284. The isolating portion 284 is located between the second penetrating groove 281 and the notch 283. The isolating portion 284 is shown as another lying L shape. A mouth of the isolating portion 284 faces downward. The rear surface of the second fastening portion 28 protrudes rearward to form the locking hook 282. An upper portion of a rear surface of the isolating portion 284 protrudes rearward to form the locking hook 282. The locking hook 282 projects beyond the rear surface of the isolating portion 284. The locking hook 282 is fastened in the corresponding construction of the shell 1 to realize that the button module 2 is located to the shell 1, and the button module 2 is fixed to the shell 1.

Figure 4:
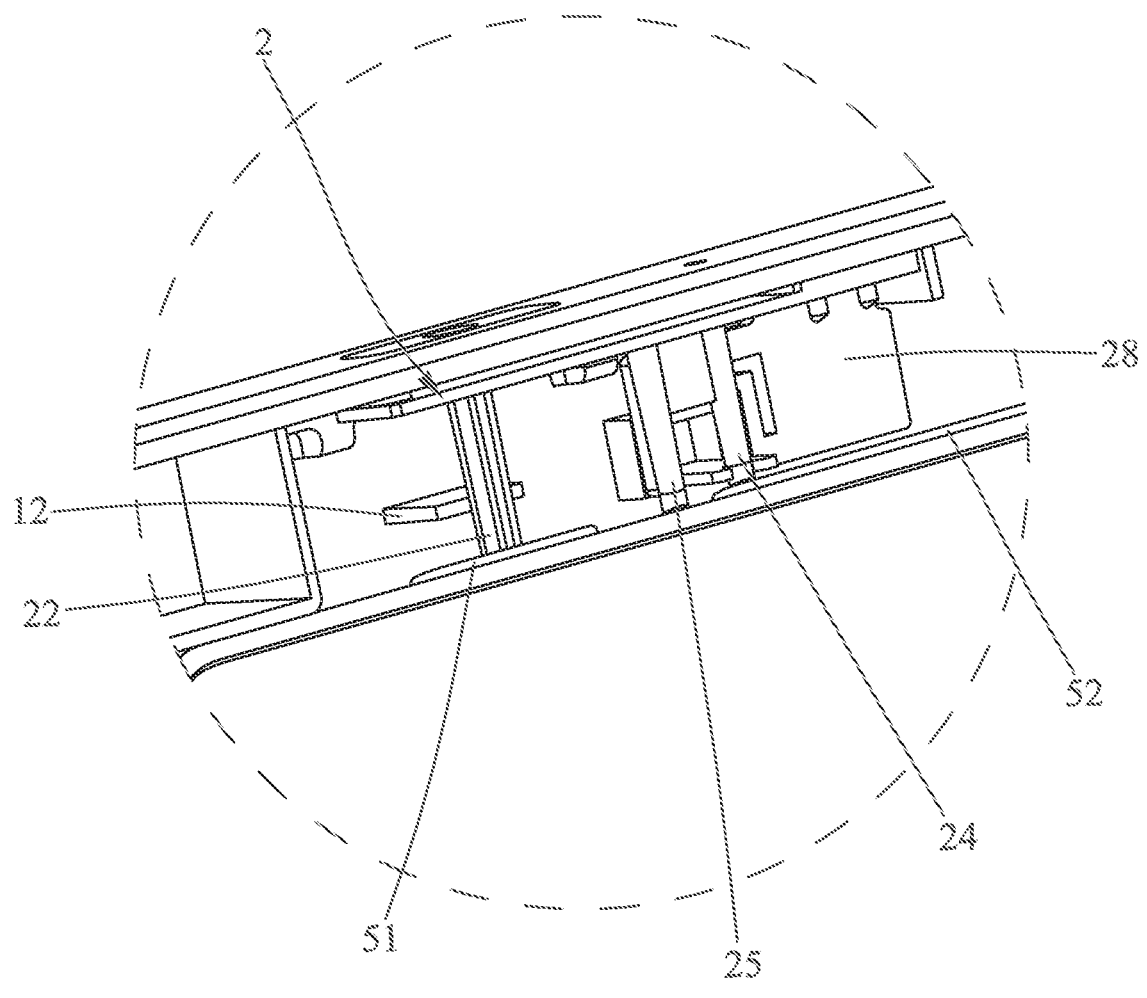
FIG. 4 is an enlarged view of an encircled portion X1 of the handheld device casing with the button module of FIG. 3.
Figure 5:
FIG. 5 is a perspective view of a shell of the handheld device casing with the button module of FIG. 1.
Figure 5:
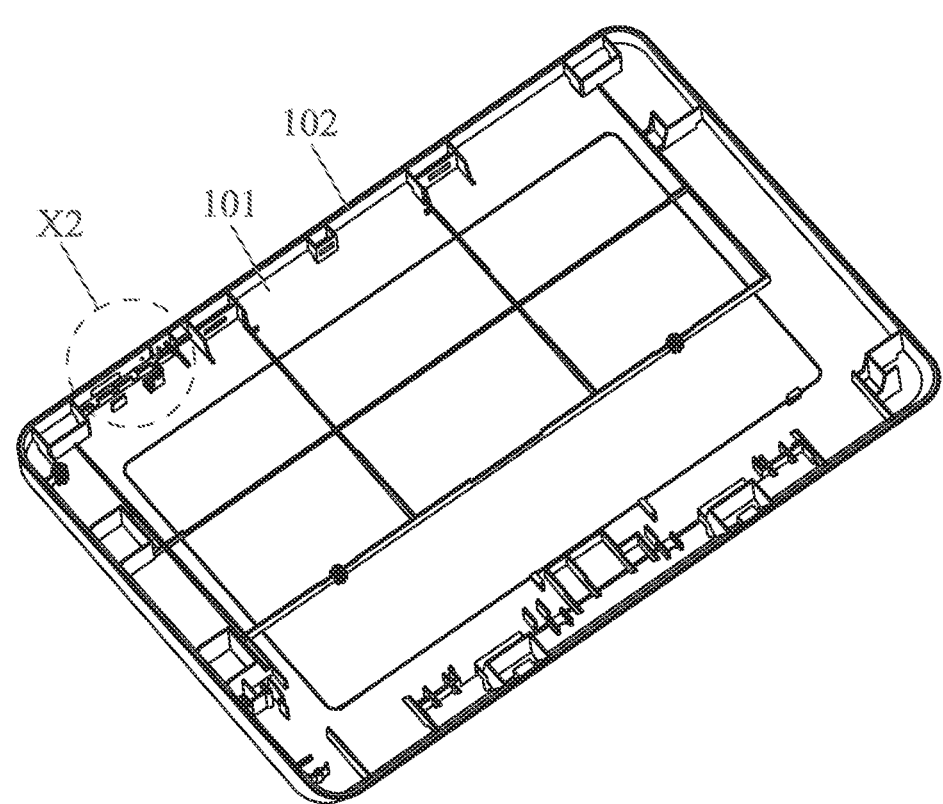
Figure 6:
FIG. 6 is an enlarged view of an encircled portion X2 of the shell of the handheld device casing with the button module of FIG. 5.
Figure 7:
FIG. 7 is a perspective view of a button module of the handheld device casing with the button module of FIG. 1.
Figure 7:
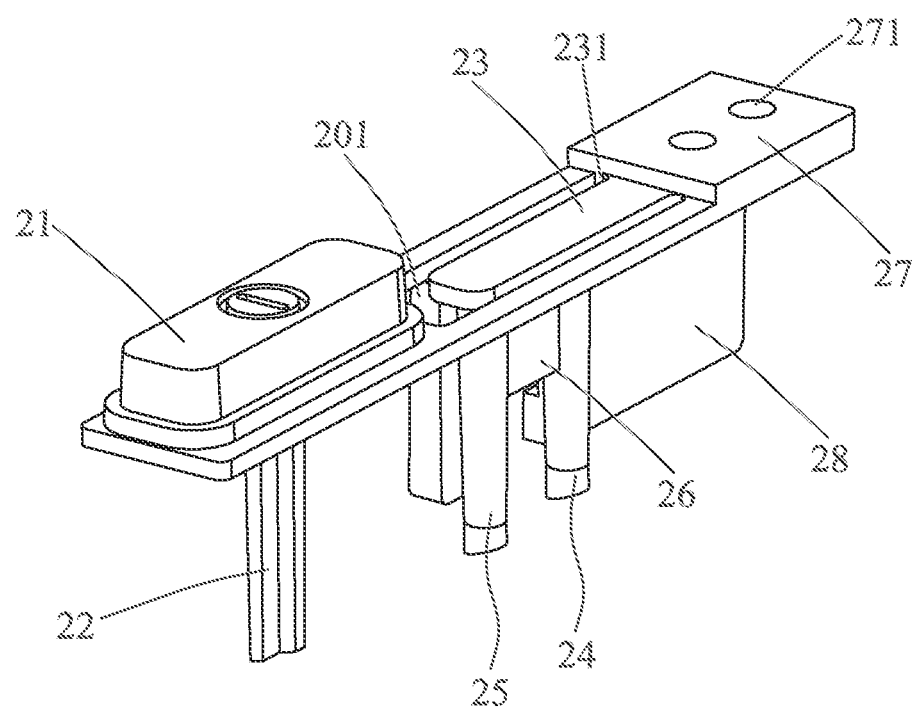
Figure 8:
FIG. 8 is another perspective view of the button module of the handheld device casing with the button module of FIG. 1.
Figure 8:
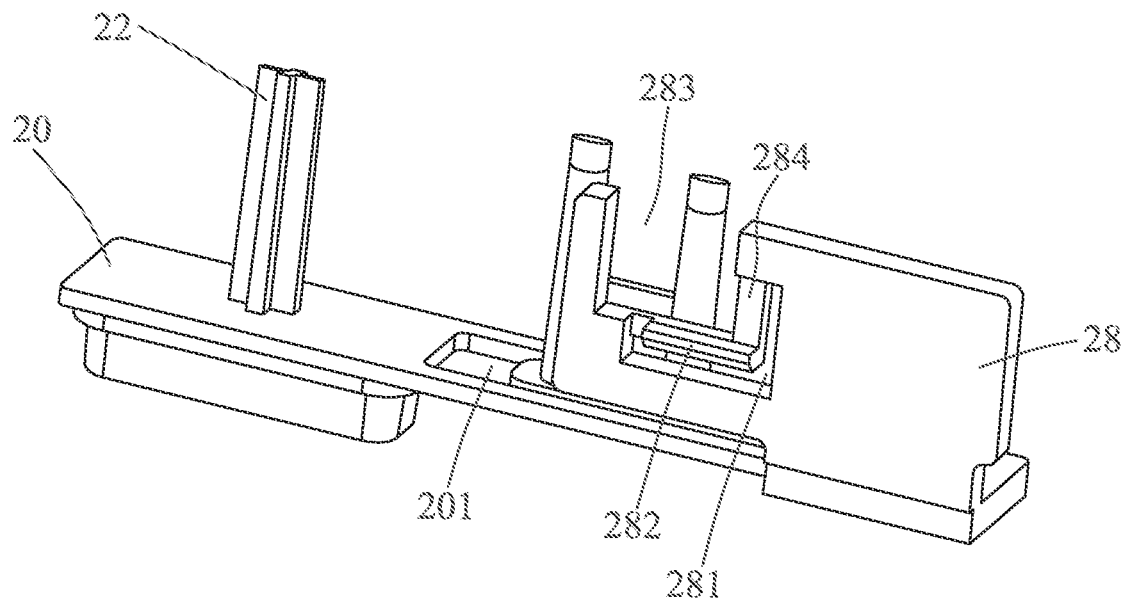

Referring to FIG. 4 to FIG. 6, the shell 1 is shown as a rectangle shape. A front of the shell 1 is opened freely. The shell 1 has a propping wall 101, and a peripheral wall 102 protruded frontward from a periphery of the propping wall 101. The shell 1 has a mounting hole 11, a first protruding portion 12, a through hole 13, a second protruding portion 14, two blocking walls 15, a protruding pillar 16 and a third protruding portion 17. In the preferred embodiment, the shell 1 has two protruding pillars 16. An upper portion of the shell 1 has the mounting hole 11 and the through hole 13. The mounting hole 11 penetrates through a top surface and a bottom surface of the upper portion of the shell 1. A top of the peripheral wall 102 defines the mounting hole 11 vertically penetrating through the top of the peripheral wall 102. The pressing button 21 of the button module 2 is fastened in the mounting hole 11. Two portions of a front surface of the propping wall 101 of the shell 1 extend frontward to form the first protruding portion 12 and the second protruding portion 14. The first triggering structure 22 of the button module 2 is disposed in front of the first protruding portion 12. The first triggering structure 22 is corresponding to the first protruding portion 12. The first triggering structure 22 abuts against a front surface of the first protruding portion 12. The second triggering structure 24 is corresponding to the second protruding portion 14. The first protruding portion 12 ensures that the first triggering structure 22 of the button module 2 is corresponding to a corresponding mechanism of the handheld computer 5. The mounting hole 11 is the corresponding mechanism of the shell 1. The first protruding portion 12 is the corresponding segment of the shell 1.

The through hole 13 penetrates through the top surface and the bottom surface of the upper portion of the shell 1. The through hole 13 vertically penetrates through the top of the peripheral wall 102. In the preferred embodiment, the through hole 13 is corresponding to the second triggering structure 24 of the button module 2. The second triggering structure 24 of the button module 2 and the abutting structure 25 of the button module 2 are disposed to a front of the second protruding portion 14. Two portions of the bottom surface of the upper portion of the shell 1 extend downward to form the two blocking walls 15. Two portions of an inner surface of the top of the peripheral wall 102 extend downward to form the two blocking walls 15. The first fastening portion 27 of the button module 2 is disposed between the two blocking walls 15. The through hole 13 is located between the mounting hole 11, and the two blocking walls 15.

The bottom surface of the upper portion of the shell 1 extends downward to form the protruding pillar 16. The inner surface of the top of the peripheral wall 102 extends downward to form the protruding pillar 16. The protruding pillar 16 is located between the two blocking walls 15. The protruding pillar 16 is disposed in the locating hole 271 of the first fastening portion 27 of the button module 2. The protruding pillar 16 penetrates through the locating hole 271 of the first fastening portion 27 of the button module 2 to realize that the button module 2 is located to the shell 1, and the button module 2 is fixed to the shell 1. Two parts of the bottom surface of the upper portion of the shell 1 extend downward to form the two protruding pillars 16. Two parts of the inner surface of the top of the peripheral wall 102 extend downward to form the two protruding pillars 16. The two protruding pillars 16 are disposed between the two blocking walls 15. The two protruding pillars 16 are disposed in the two locating holes 271 of the first fastening portion 27 of the button module 2. The two protruding pillars 16 penetrate through the two locating holes 271 of the first fastening portion 27 of the button module 2 to realize that the button module 2 is located to the shell 1, and the button module 2 is fixed to the shell 1.

The front surface of the propping wall 101 of the shell 1 extends frontward to form the third protruding portion 17. The third protruding portion 17 is connected with one blocking wall 15 which is away from the through hole 13. One end of the second fastening portion 28 of the button module 2 which is away from the second triggering structure 24 abuts against a front surface of the third protruding portion 17. A right end of the second fastening portion 28 of the button module 2 abuts against the front surface of the third protruding portion 17. The other end of the second fastening portion 28 abuts against a front surface of the second protruding portion 14. A left end of the second fastening portion 28 of the button module 2 abuts against the front surface of the second protruding portion 14. The two protruding pillars 16 are the two corresponding positions of the shell 1.

The second protruding portion 14 is located between the first protruding portion 12 and the third protruding portion 17. The second protruding portion 14 has a protruding block 140, a locating groove 141, a first extending portion 142, a second extending portion 143, a third extending portion 144 and a locking groove 145. The front surface of the propping wall 101 of the shell 1 extends frontward to form the protruding block 140. The notch 283 of the second fastening portion 28 of the button module 2 is corresponding to the protruding block 140. A middle of a front of a lower portion of the second protruding portion 14 is recessed inward to form the locating groove 141. A middle of a front end of the protruding block 140 is recessed inward to form the locating groove 141. The second triggering structure 24 of the button module 2 is disposed in the locating groove 141. The locating groove 141 ensures that the second triggering structure 24 of the button module 2 is corresponding to the corresponding mechanism of the handheld computer 5.

One end of the protruding block 140 which is adjacent to the first protruding portion 12 extends upward to form the first extending portion 142. A left end of the protruding block 140 extends upward to form the first extending portion 142. The other end of the second fastening portion 28 abuts against a front surface of the first extending portion 142 of the second protruding portion 14. The left end of the second fastening portion 28 of the button module 2 abuts against the front surface of the first extending portion 142 of the second protruding portion 14. A top end of the first extending portion 142 extends rightward and opposite to the first protruding portion 12 to form the second extending portion 143. The second fastening portion 28 of the button module 2 is disposed to the second extending portion 143.

The locking hook 282 of the second fastening portion 28 of the button module 2 is disposed to a top of the second extending portion 143. One end of the second extending portion 143 which is away from the first protruding portion 12 extends upward to form the third extending portion 144. The second extending portion 143 is disposed between the first extending portion 142 and the third extending portion 144. A right end of the second extending portion 143 extends upward to form the third extending portion 144. The locking groove 145 is formed between the second extending portion 143 and the third extending portion 144. A junction between the second extending portion 143 and the third extending portion 144 is sighted by the second penetrating groove 281 of the button module 2, so an assembly position of the locking hook 282 of the button module 2 is ensured. The locking hook 282 of the button module 2 is fastened in the locking groove 145 to realize that the button module 2 is located to the shell 1, and the button module 2 is fixed to the shell 1. The second extending portion 143 is the corresponding location of the shell 1. The locking groove 145 is the corresponding construction of the shell 1.

The second fastening portion 28 of the button module 2 abuts against the front surface of the first extending portion 142, a front surface of the second extending portion 143 and a front surface of the third extending portion 144. In the preferred embodiment, a distance between the front surface of the third protruding portion 17 and the front surface of the propping wall 101 of the shell 1 is equal to a distance between the front surface of the first extending portion 142 and the front surface of the propping wall 101 of the shell 1, a distance between the front surface of the second extending portion 143 and the front surface of the propping wall 101 of the shell 1, and a distance between the front surface of the third extending portion 144 and the front surface of the propping wall 101 of the shell 1, so the second fastening portion 28 of the button module 2 is horizontally disposed to the second protruding portion 14 and the third protruding portion 17.

Referring to FIG. 4, the handheld device casing with the button module 100 accommodates the handheld computer 5. The handheld computer 5 is accommodated in the shell 1. The handheld computer 5 has a first function button 51 and a second function button 52. The first function button 51 and the second function button 52 are disposed inside the shell 1. One portion of a top surface of the handheld computer 5 extends upward to form the first function button 51. The top surface of the handheld computer 5 extends upward to form the second function button 52. The second function button 52 is spaced from the first function button 51. The first triggering structure 22 of the button module 2 is corresponding to the first function button 51. The first function button 51 is the corresponding mechanism of the handheld computer 5.

Referring to FIG. 3 to FIG. 8, when the pressing button 21 of the button module 2 is pressed downward, the first triggering structure 22 of the button module 2 presses downward the first function button 51. The handheld computer 5 executes a function of the first function button 51. The second triggering structure 24 of the button module 2 is corresponding to the second function button 52. When the elastic arm 23 of the button module 2 is pressed downward via the through hole 13 of the shell 1, the second triggering structure 24 of the button module 2 presses downward the second function button 52, the handheld computer 5 executes a function of the second function button 52. The abutting structure 25 of the button module 2 is located between the first function button 51 and the second function button 52, the abutting structure 25 abuts downward against the housing 501 of the handheld computer 5. In the preferred embodiment, the first function button 51 is a power button. The second function button 52 is a reset button. In a concrete implementation, the first function button 51 is without being limited to be the power button. The second function button 52 is without being limited to be the reset button. The first function button 51 and the second function button 52 are the two corresponding mechanisms of the handheld computer 5.

As described above, when the button module 2 is pressed, the pressing button 21 and the elastic arm 23 are prevented from being simultaneously triggered by the first penetrating groove 201. The first triggering structure 22 of the button module 2 is corresponding to the first function button 51 of the handheld computer 5, and the second triggering structure 24 of the button module 2 is corresponding to the second function button 52 of the handheld computer 5, so the handheld computer 5 keeps a distance from the shell 1, and a function of the handheld computer 5 is still used, the handheld device casing with the button module 100 is able to be cooperated with various handheld computers to proceed with an operation, and the handheld device casing with the button module 100 is prevented from simultaneously pressing multiple buttons at the same time. As a result, the handheld device casing with the button module 100 prevents a linkage and a wrong operation between two adjacent buttons of the handheld device casing with the button module 100.

What is claimed is:

1. A handheld device casing with a button module, comprising:

a shell having a propping wall, and a peripheral wall protruded frontward from a periphery of the propping wall, two portions of a front surface of the propping wall of the shell extending frontward to form a first protruding portion and a second protruding portion, a middle of a front of a lower portion of the second protruding portion being recessed inward to form a locating groove;

a button module disposed in the shell, the button module having a main portion, the main portion having a first penetrating groove, a first triggering structure and an elastic arm, the first triggering structure being disposed to one end of the first penetrating groove, the first triggering structure being disposed to a bottom surface of the main portion, the first triggering structure being corresponding to the first protruding portion, the elastic arm being disposed in the first penetrating groove, the elastic arm being connected to a side wall of the first penetrating groove, the side wall of the first penetrating groove being far away from the first triggering structure, a bottom surface of the elastic arm having a second triggering structure and an abutting structure, the abutting structure being disposed between the first triggering structure and the second triggering structure, the second triggering structure being corresponding to the second protruding portion, the second triggering structure being disposed in the locating groove; and a handheld computer disposed in a middle of the shell, the handheld computer having a first function button and a second function button, the first triggering structure being corresponding to the first function button, the second triggering structure being corresponding to the second function button.

2. The handheld device casing with the button module as claimed in claim 1, wherein the button module has a pressing button, a top surface of one end of the main portion extends upward to form a first fastening portion, the pressing button is disposed on a top surface of the other end of the main portion, one end of the elastic arm is connected with the first fastening portion, the first fastening portion has a locating hole penetrating through a top surface and a bottom surface of the first fastening portion, two portions of a bottom surface of an upper portion of the shell extend downward to form two blocking walls, the first fastening portion is disposed between the two blocking walls, the bottom surface of the upper portion of the shell extends downward to form a protruding pillar, the protruding pillar is located between the two blocking walls, the protruding pillar penetrates through the locating hole.

3. The handheld device casing with the button module as claimed in claim 2, wherein the first fastening portion has two locating holes penetrating through the top surface and the bottom surface of the first fastening portion, two parts of the bottom surface of the upper portion of the shell extend downward to form two protruding pillars, the two protruding pillars are disposed between the two blocking walls, the two protruding pillars penetrate through the two locating holes.

4. The handheld device casing with the button module as claimed in claim 2, wherein one side of the first fastening portion extends downward to form a second fastening portion, the second fastening portion is fastened in the shell, the front surface of the propping wall of the shell extends frontward to form a third protruding portion, the third protruding portion is connected with one blocking wall, a right end of the second fastening portion abuts against a front surface of the third protruding portion, a left end of the second fastening portion abuts against a front surface of the second protruding portion.

5. The handheld device casing with the button module as claimed in claim 4, wherein a lower portion of the second fastening portion is recessed inward to form a notch, the second protruding portion has a protruding block, the front surface of the propping wall of the shell extends frontward to form the protruding block, the notch is corresponding to the protruding block.

6. The handheld device casing with the button module as claimed in claim 5, wherein a front end of the protruding block is recessed inward to form the locating groove, a left end of the protruding block extends upward to form a first extending portion, a top end of the first extending portion extends rightward to form a second extending portion, a right end of the second extending portion extends upward to form a third extending portion, a locking groove is formed between the second extending portion and the third extending portion, the second fastening portion protrudes rearward to form a locking hook, the locking hook is fastened in the locking groove, the second fastening portion abuts against a front surface of the first extending portion, a front surface of the second extending portion and a front surface of the third extending portion.

7. The handheld device casing with the button module as claimed in claim 6, wherein the second fastening portion has a second penetrating groove and an isolating portion, the second penetrating groove penetrates through a front surface and a rear surface of the second fastening portion, the second penetrating groove and the notch are isolated by the isolating portion, the isolating portion is located between the second penetrating groove and the notch, the locking hook projects beyond a rear surface of the isolating portion, the second penetrating groove is shown as a lying L shape, the isolating portion is shown as another lying L shape.

8. The handheld device casing with the button module as claimed in claim 1, wherein the button module has a pressing button, the pressing button is disposed to the one end of the first penetrating groove, the first triggering structure is disposed to a bottom surface of the pressing button, an upper portion of the shell has a mounting hole and a through hole, the mounting hole penetrates through a top surface and a bottom surface of the upper portion of the shell, the through hole penetrates through the top surface and the bottom surface of the upper portion of the shell, the pressing button is fastened in the mounting hole, the through hole is corresponding to the second triggering structure.

9. A handheld device casing with a button module, comprising:
    a shell;
    a button module disposed in the shell, the button module having:
        a main portion;
        a first fastening portion disposed on a top surface of one end of the main portion, the first fastening portion being connected with the shell;
        a first triggering structure extended downward from a bottom surface of the other end of the main portion;
        a first penetrating groove formed in the main portion, the first penetrating groove being disposed between the first fastening portion and the first triggering structure;
        an elastic arm disposed in the first penetrating groove, the elastic arm being connected to a side wall of the first penetrating groove, the side wall of the first penetrating groove being close to the first fastening portion, the elastic arm being a cantilever arm; and
        a second triggering structure extended downward from a bottom surface of the elastic arm;
    a handheld computer accommodated in the shell, the handheld computer having:
        a first function button disposed inside the shell, the first triggering structure being corresponding to the first function button; and
        a second function button disposed inside the shell, the second triggering structure being corresponding to the second function button.

10. The handheld device casing with the button module as claimed in claim 9, wherein the bottom surface of the elastic arm extends downward to form an abutting structure, the abutting structure is disposed between the first triggering structure and the second triggering structure, the abutting structure is corresponding to a housing of the handheld computer, the abutting structure abuts downward against the housing of the handheld computer.

11. The handheld device casing with the button module as claimed in claim 10, wherein a length of the abutting structure is longer than a length of the second triggering structure.

12. The handheld device casing with the button module as claimed in claim 10, wherein one side of the first fastening portion extends downward to form a second fastening portion, the second fastening portion is fastened in the shell, a rear surface of the second fastening portion protrudes rearward to form a locking hook, the shell has a propping wall, and a peripheral wall protruded frontward from a periphery of the propping wall, a front surface of the propping wall of the shell extends frontward to form a protruding block, a left end of the protruding block extends upward to form a first extending portion, a top end of the first extending portion extends rightward to form a second extending portion, a right end of the second extending portion extends upward to form a third extending portion, the second extending portion is disposed between the first extending portion and the third extending portion, a locking groove is formed between the second extending portion and the third extending portion, the second fastening portion abuts against a front surface of the first extending portion, a front surface of the second extending portion and a front surface of the third extending portion, the locking hook is fastened in the locking groove.

13. The handheld device casing with the button module as claimed in claim 12, wherein the button module has a pressing button, the pressing button is disposed on a top surface of the other end of the main portion, the first triggering structure is opposite to the pressing button, an upper portion of the shell has a mounting hole penetrating through a top surface and a bottom surface of the upper portion of the shell, the pressing button is fastened in the mounting hole, the front surface of the propping wall of the shell extends frontward to form a first protruding portion, the first triggering structure abuts against a front surface of the first protruding portion, a front end of the protruding block is recessed inward to form a locating groove, the second triggering structure is disposed in the locating groove.

14. The handheld device casing with the button module as claimed in claim 13, wherein a lower portion of the second fastening portion is recessed inward to form a notch, the notch is corresponding to the protruding block, the second fastening portion has a second penetrating groove and an isolating portion, the second penetrating groove penetrates through a front surface and the rear surface of the second fastening portion, the isolating portion is located between the second penetrating groove and the notch, the locking hook projects beyond a rear surface of the isolating portion, the second penetrating groove is shown as a lying L shape, the isolating portion is shown as another lying L shape.

15. The handheld device casing with the button module as claimed in claim 9, wherein the first fastening portion has two locating holes penetrating through a top surface and a bottom surface of the first fastening portion, two portions of a bottom surface of an upper portion of the shell extend downward to form two blocking walls, the first fastening portion is disposed between the two blocking walls, two parts of the bottom surface of the upper portion of the shell extend downward to form two protruding pillars, the two protruding pillars are disposed between the two blocking walls, the two protruding pillars penetrate through the two locating holes.

16. A handheld device casing with a button module, comprising:
    a shell;
    a button module disposed in the shell, the button module having:
        a main portion;
        a first fastening portion disposed on a top surface of one end of the main portion, the first fastening portion being connected with the shell;
        a second fastening portion fastened in the shell, one side of the first fastening portion extending downward to form the second fastening portion;
        a first triggering structure extended downward from a bottom surface of the other end of the main portion;
        a pressing button disposed on a top surface of the other end of the main portion, the first triggering structure being opposite to the pressing button;
        a first penetrating groove formed in the main portion, the first penetrating groove being disposed between the first fastening portion and the first triggering structure;
        an elastic arm disposed in the first penetrating groove, the elastic arm being connected to a side wall of the first penetrating groove, the side wall of the first penetrating groove being close to the first fastening portion;

a second triggering structure extended downward from a middle of a bottom surface of the elastic arm; and an abutting structure disposed to the bottom surface of the elastic arm, the abutting structure being disposed between the first triggering structure and the second triggering structure; and a handheld computer disposed in a middle of the shell, the handheld computer having a housing, a first function button and a second function button, the first triggering structure being corresponding to the first function button, the second triggering structure being corresponding to the second function button, the abutting structure being located between the first function button and the second function button, the abutting structure being corresponding to the housing.

17. The handheld device casing with the button module as claimed in claim 16, wherein the first triggering structure and the second triggering structure increase a using distance between the handheld computer and the shell.

* * * * *